US006963728B2

(12) United States Patent
Edwards et al.

(10) Patent No.: US 6,963,728 B2
(45) Date of Patent: Nov. 8, 2005

(54) LOW POWER, HIGH SPEED DATA COMMUNICATIONS IN VEHICLES

(75) Inventors: Daniel R. Edwards, Ypsilanti, MI (US); Robert A. DiPaolo, Northville, MI (US); Daniel E. Farnstrom, Redford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 320 days.

(21) Appl. No.: 10/146,214

(22) Filed: May 15, 2002

(65) Prior Publication Data

US 2003/0216149 A1 Nov. 20, 2003

(51) Int. Cl.[7] ........................... H04B 5/00; H04B 1/034

(52) U.S. Cl. ................... 455/41.2; 455/41.1; 455/41.3; 455/95; 455/96; 455/99; 340/854.7

(58) Field of Search ............................. 455/41.1, 41.2, 455/41.3, 98, 99, 95, 96, 97, 100; 340/854.7; 385/101

(56) References Cited

U.S. PATENT DOCUMENTS 5,264,064 A 11/1993 Hughes
6,091,372 A * 7/2000 Dienes ........................ 343/770
6,594,471 B1 * 7/2003 Crowley et al. ......... 455/575.7
2004/0204187 A1 * 10/2004 Nevermann .............. 455/575.1

FOREIGN PATENT DOCUMENTS

JP 7177071 7/1995
JP 8223095 8/1996

* cited by examiner

*Primary Examiner*—Nick Corsaro
(74) *Attorney, Agent, or Firm*—MacMillan, Sobanski & Todd LLC

(57) ABSTRACT

Cavities within structural members of a motor vehicle or other structure are used for propagation of wireless RF communication signals. The system is particularly adapted for use in structures wherein permanent, fixed transmission guides can be easily provided, and it is especially useful in motor vehicles where it 1) reduces the cost and power requirements of electronic modules using wireless communication, 2) shields the communication channel from outside electromagnetic interference, and 3) allows the propagation of emissions to be substantially restricted to desired regions away from people and electronic devices not in the intended network.

27 Claims, 5 Drawing Sheets

LOW POWER, HIGH SPEED DATA COMMUNICATIONS IN VEHICLES

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to low power, high speed wireless data communications, and, more specifically, to providing high speed wireless communication links in structures such as motor vehicles with reduced interference, reduced human exposure, and low cost.

Due to the advancement of controls and the various electronic accessories being installed in motor vehicles, data transfer rates must be used which exceed the capacity of simple twisted wire (or coaxial cable) multiplex networks to carry. High data rate devices such as video cameras or radar sensors may be deployed at the exterior of a vehicle while the high speed data they create needs to be sent elsewhere in the vehicle for processing or display. As the number of electronic modules increases, the complexity and cost associated with the wire, connectors, and the routing of the wires becomes excessive. In addition, mechanical failures of wires in large wire bundles can be difficult to isolate and costly to repair. Fiber optic cables may be employed for high speed communication channels, but they result in high costs and may not be well suited to the harsh automotive environment.

Wireless technologies, such as Bluetooth and the IEEE standard 802.11 for wireless networks, can be used in vehicles but certain disadvantages have slowed their adoption. The radio-frequency (RF) radiation produced by a wireless transmitter in a vehicle can cause interference for and undesired interoperation with other systems in the same vehicle or in other nearby vehicles. The wireless receiver is susceptible to interference from other wireless devices as well as other man-made and natural interference such as lightning. Power output drivers for the transmitter must operate at sufficiently high power in order to overcome potential sources of interference. Furthermore, existing systems are omni-directional and radiate in substantially all directions into free space even though only a small portion of the radiated power is used by the intended receiver(s). The size of the output drivers that have been required to provide the necessary amount of power has resulted in high transceiver cost.

SUMMARY OF THE INVENTION

The present invention has the advantage of providing high speed wireless communications at lower power with lower cost, reduced susceptibility to interference, and less interference created for other devices. It employs an enclosed cavity to transport RF signals between wireless devices within a structure, such as a vehicle. Preferably, the cavity or transmission guide may be an enclosed, elongated space within a structural member of the structure.

In one aspect of the present invention, a method is provided for distributing information from a first electronic module to a second electronic module, wherein the first and second electronic modules are in physically separated locations within a structure. A structural member forming a portion of the structure is selected for use as a transmission guide having an enclosed, elongated space with first and second openings substantially proximate to the first and second electronic modules, respectively. The information is encoded in the first electronic module into a radio-frequency signal. The radio-frequency signal is coupled from the first electronic module into the transmission guide at the first opening. The radio-frequency signal is coupled from the transmission guide at the second opening to the second electronic module. The radio-frequency signal is decoded in the second electronic module to recover the information.

As used herein, structural member refers to any component part that is fixed within a vehicle and creates an enclosed space, including but not limited to any load-bearing members, ducts, or other pre-existing components serving other purposes in the vehicle.

DETAILED DESCRIPTION OF PREFERRED EMBODIMENTS

The invention is particularly adapted for use in structures wherein permanent, fixed transmission guides can be easily provided, and it is especially useful in motor vehicles where it 1) reduces the cost and power requirements of electronic modules, 2) shields the communication channel from outside electromagnetic interference, and 3) allows the propagation of emissions to be substantially restricted to desired regions away from people and electronic devices not in the intended network. The transmission guides used herein are similar to known waveguides, but the typical stringent size and shape requirements associated with waveguides (due to the need to control transmission modes, etc.) need not be met in the present invention. The advantages of lower power requirements and decreased interference are obtained without the usual constraints on waveguide construction. In other words, the present invention can tolerate some losses due to non-optimal transmission guide geometries yet still provide significant improvements versus unbounded free space transmission.

Figure 1:
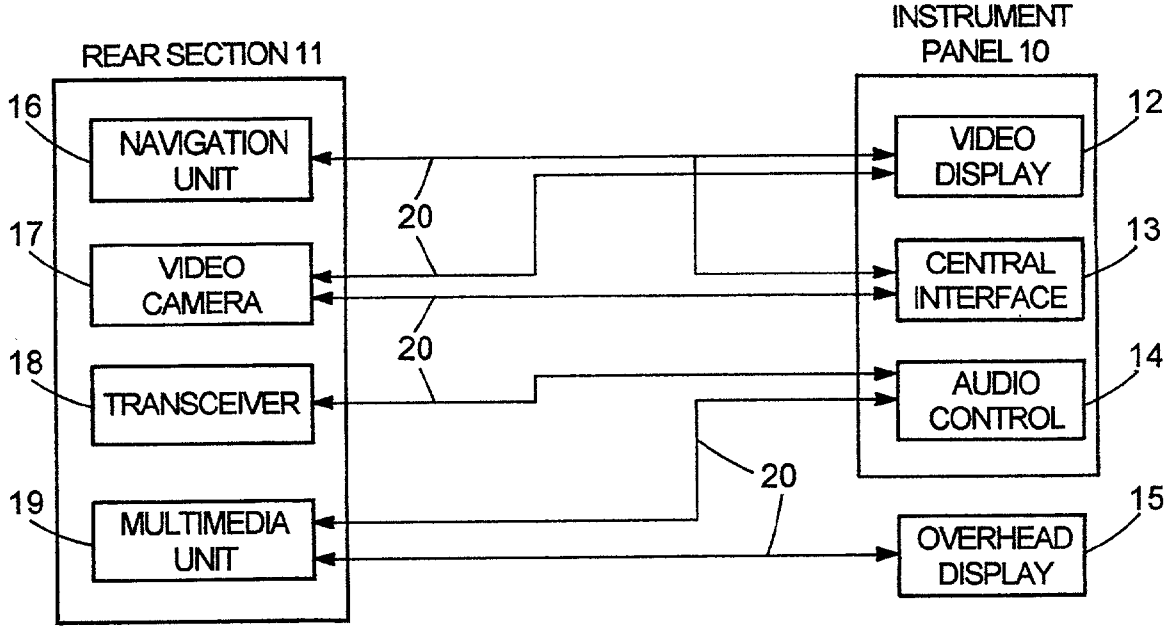
FIG. 1 is a block diagram showing high speed data devices hardwired together in a vehicle.

Referring to the hardwired system of FIG. 1, an instrument panel 10 located at the front end of a vehicle passenger compartment includes various electronic modules that interface with other electronic modules located in a rear section 11 of the vehicle (e.g., a rear package tray, a rear seat console, and/or a luggage compartment). A video display 12, a central control interface 13 (e.g., a vehicle command center such as an in-car personal computer), and an audio control or head unit 14 are incorporated into instrument panel 10. An overhead display 15 may be located in the vehicle headliner. Electronic modules in rear section 11 include a navigation unit 16, a video camera 17, a cellular telephone transceiver 18, and a multimedia unit 19. Extensive hardwiring via wire bundles 20 is required to support the connectivity of these modules. For example, navigation unit 16 may exchange signals with central interface 13 to obtain input data for a desired destination address and with video display 12 to provide map displays and turn-by-turn instructions. Video display 12 is also connected to video camera 17 to provide a view of blind spots around the vehicle. Audio control unit 14 may include media playback mechanisms (e.g., CD audio, DVD, and cassette tape) that send playback signals to multimedia unit 19 which includes an amplifier and speakers. Multimedia unit 19 may also include a playback mechanism (e.g., a DVD player) and may provide video signals (e.g., movies) to overhead display 15. Central interface 13 may include hands-free telephone functionality for conducting voice and/or data calls through transceiver 18 with a cellular network. In order to reproduce hands-free speaker signals, central interface 13 and/or transceiver 18 may also be interconnected with multimedia unit 19.

The systems in FIG. 1 show just some examples of electronic modules relying on high speed communications. Many other vehicle systems can be employed in the present invention, such as engine control units, sensors, actuators, vehicle radar systems, supplemental restraint systems, and others.

Figure 2:
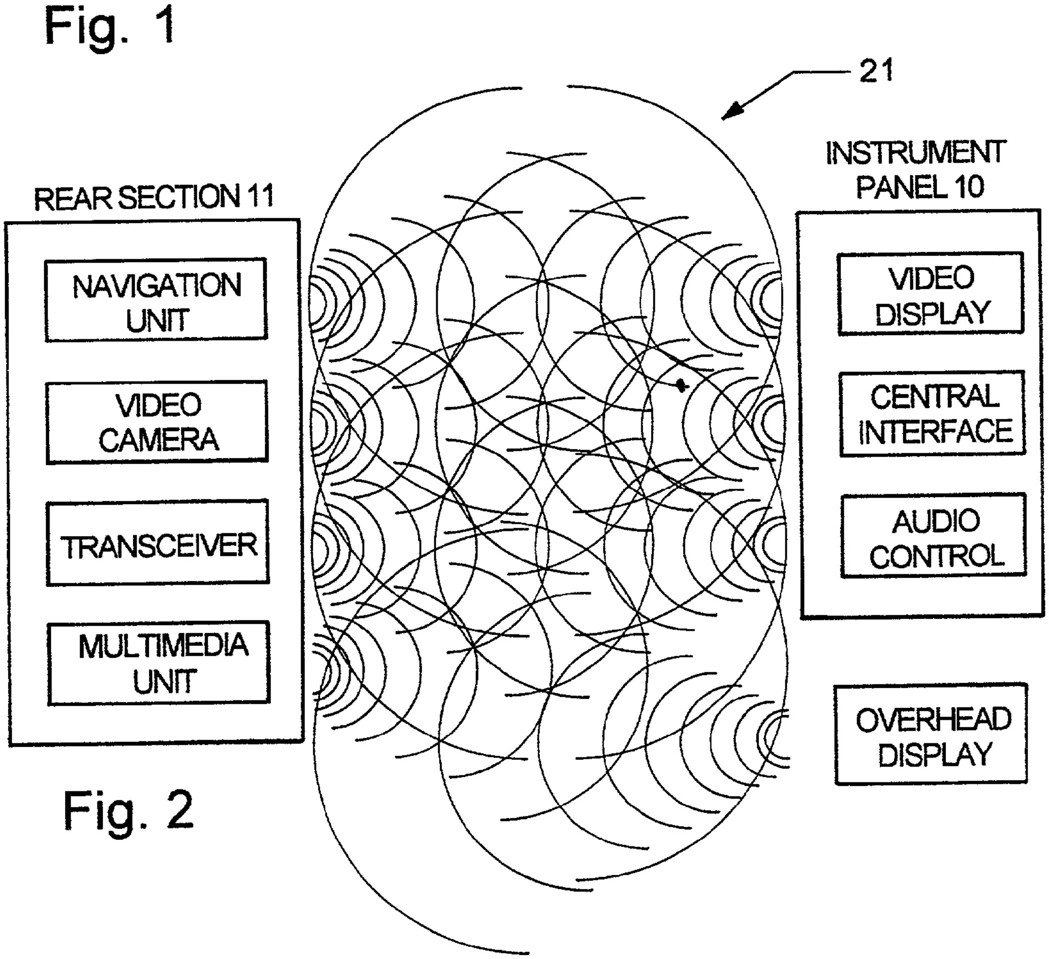
FIG. 2 is a block diagram wherein the devices of FIG. 1 utilize wireless communications in free space.

Thus, it can be seen that large amounts of high speed data need to be transported within a vehicle. Using hardwiring for such data transport creates problems due to the large number of wires and connectors that are necessary. Dedicated output connections in each module for a dedicated wiring path to each separate other module with which it interacts further increases module costs. Use of a simple multiplex network reduces the number of output connections, but it is costly to obtain the required data speeds in a simple wired configuration or may not be technically feasible. Thus, wireless RF communication could be considered as shown in FIG. 2. Using wireless data transfer over free air, however, leads to the higher power requirements and increased interference problems described above as radiation 21 permeates the vehicle space.

Figure 3:
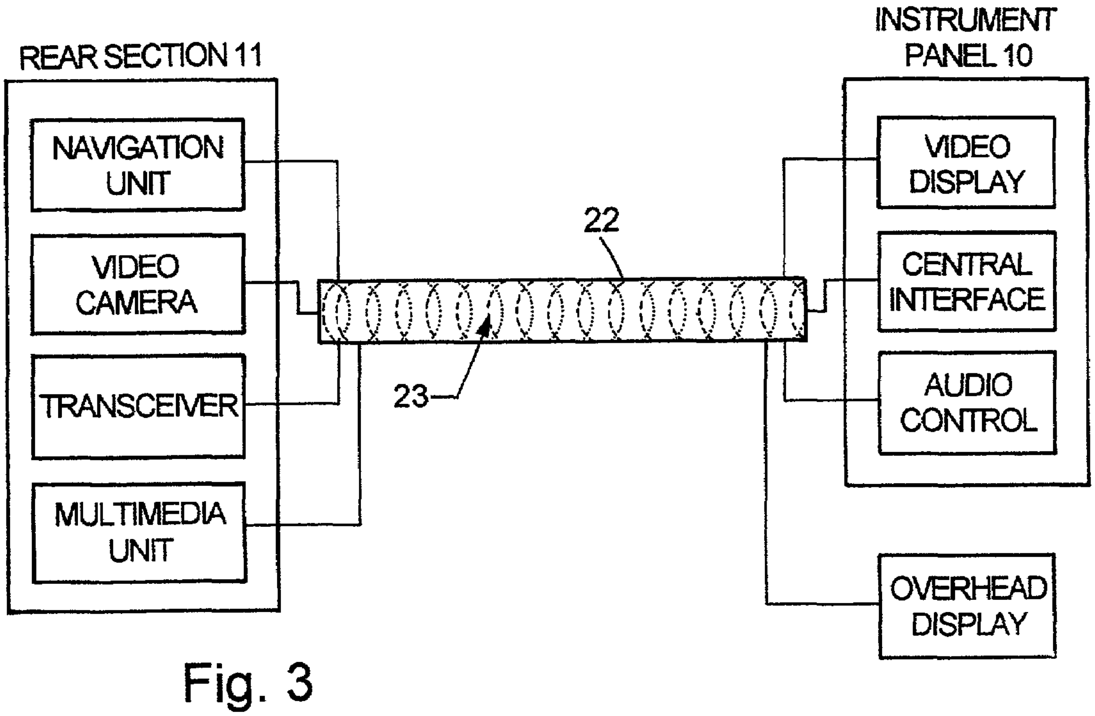
FIG. 3 is a block diagram showing the transmission guide of the present invention for carrying the wireless signals between devices.

The problems of the prior art are solved using the invention as shown in FIG. 3. A transmission guide 22 substantially confines and guides radiation 23 among and between any electronic modules coupled to guide 22, with at most only short wiring paths being required between a module and a respective antenna deployed within guide 22.

Figure 4:
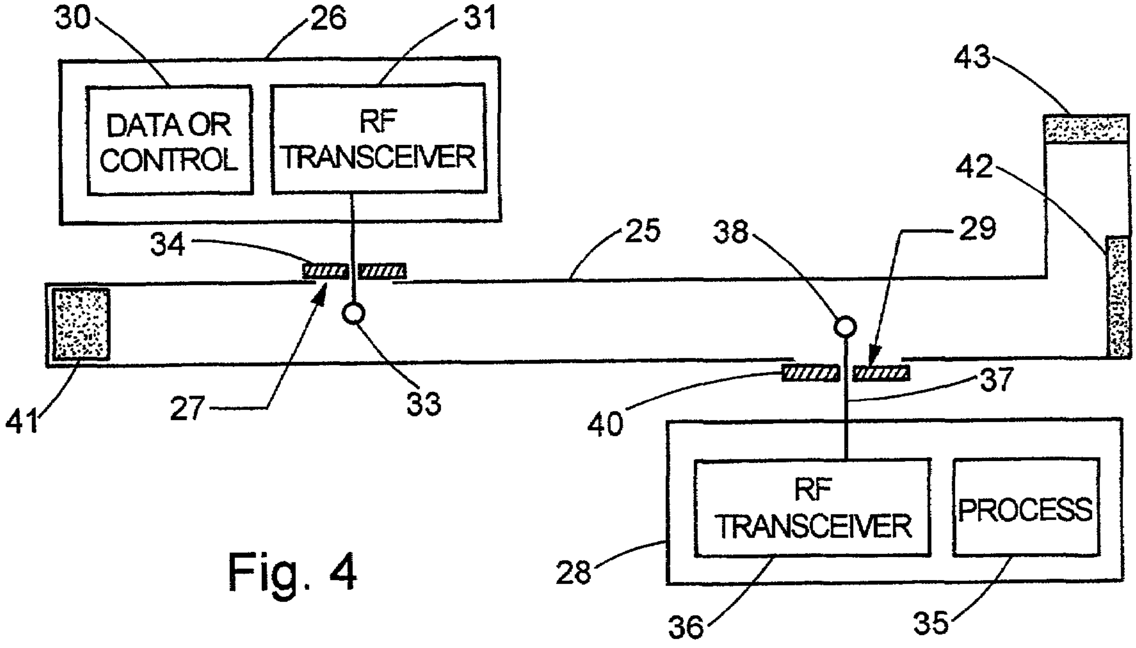
FIG. 4 shows a wireless communication link of the invention in greater detail.

FIG. 4 shows an example of two communicating modules in greater detail. A structural member 25 may be a body or frame member of a vehicle, a duct, or a panel enclosure, for example. Either a structural member performing an already existing structural function or a member dedicated to use only as a transmission guide can be employed. All that is necessary is that the structural member provide an enclosed, elongated space of sufficient dimensions to carry the wireless RF signal (i.e., the transmission guide cross section must be sufficiently large based on the wavelength of the RF signal) and that it be made of an electrically conducting material (e.g., metal, such as iron, nickel, aluminum) to reflect the RF radiation. In order to transport high speed data, an RF frequency of greater than about 1 GHz may preferably be used. For instance, an IEEE 802.11 system in the range of 5.1 to 5.3 GHz can be used, resulting in a minimum transmission guide cross-sectional dimension of about 5 cm. Greater cross-sectional dimensions for the transmission guide are permissible, since it is just the minimum actual cross-section that determines the cutoff frequency of the transmission guide.

A first electronic module 26 is located near a first opening 27 in member 25 and a second electronic module 28 is located near a second opening 29. Structural member 25 between openings 27 and 29 functions as a transmission guide for channeling RF signals between modules 26 and 28. First module 26 includes a data or control block 30 which generates information (e.g., high speed video data) to be shared with second module 28. The information is encoded and amplified into an RF signal in a transceiver 31. The RF signal is conducted by a cable 32 through opening 27 to an antenna 33 which radiates the RF signal into the transmission guide. In a preferred embodiment, opening 27 is sealed in order to maximize confinement of the RF radiation, thereby reducing power requirements and interference. Thus, a plate 34 of electrically conductive material is provided to seal opening 27. Second module 28 includes a process block 35 for receiving and using the shared information. A transceiver 36 is connected by a cable 37 and an antenna 38 in order to receive the RF signals radiated by antenna 33. In most embodiments, antenna 38 also radiates RF signals from transceiver 36 to antenna 33 for coupling to transceiver 31, at least for purposes of acknowledgement or other wireless protocol signals (if not for sharing system information from second module 28 to first module 26). A seal 40 also covers opening 29.

Since structural member 25 may preferably be serving structural support or other functions, its overall shape might not be (and need not be) ideal as a waveguide, provided that a minimum cross-sectional dimension is met in the guide paths between antennas. Although FIG. 4 shows the transmission guide as a straight segment along structural member 25, the transmission guide need not be straight or have any other particular layout. The cross-section can deviate from square, round, or straight and can possess complex geometries. If a particular shape being used is such that certain surfaces of the enclosed, elongated space cause undesirable reflections (e.g., causing self-interference), however, then RF absorbing material can be added in the enclosed space to limit the undesirable reflections. Thus, RF absorbing material 41, 42, and 43, are strategically located in member 25 to inhibit potentially undesirable reflections at the positions shown in FIG. 4. Known RF absorbing materials can be used such as ferrite tiles or polyurethane foam impregnated with carbon.

Figure 5:
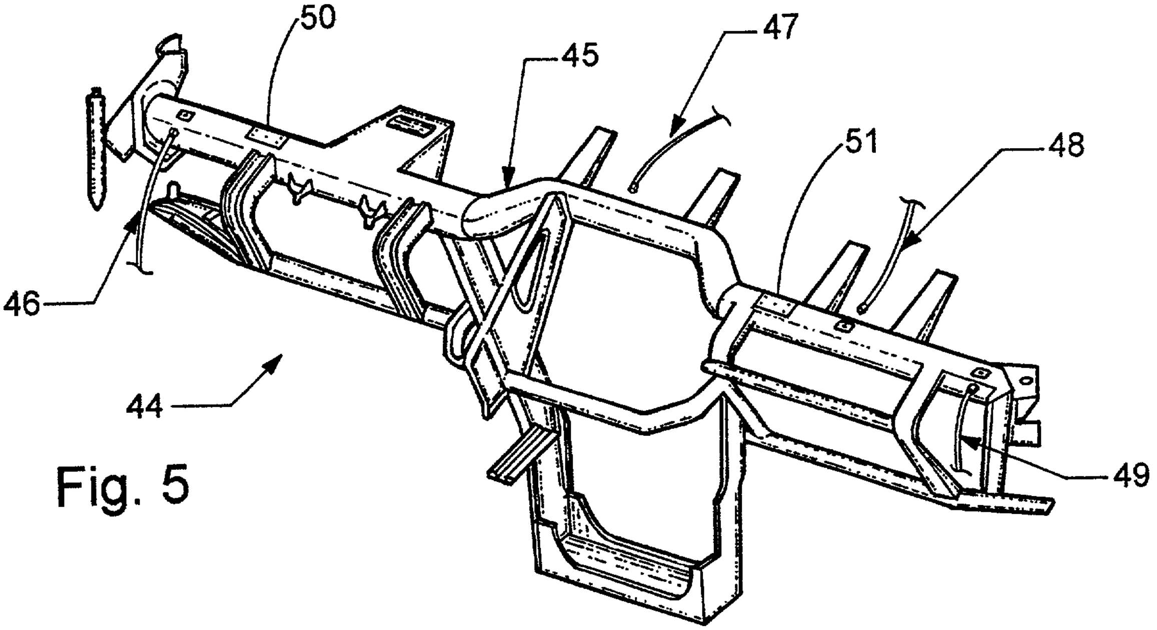
FIG. 5 is a perspective view of a cross-car beam for providing a transmission guide with several wireless transceivers coupled thereto.

FIG. 5 shows a cross-car beam having several access points for modules to create a wireless network. A cross-car beam is usually mounted from side to side in a vehicle body. A front cross-car beam may provide support for an instrument panel and a rear cross-car beam may provide rear seat support. Cross-car beam 44 in FIG. 5 includes a tubular frame with a main crossbeam 45 to which remote cable connections 46, 47, and 48 are made. In addition, printed circuits board modules 50 and 51 are mounted substantially directly on crossbeam 45 over respective openings.

Figure 6:
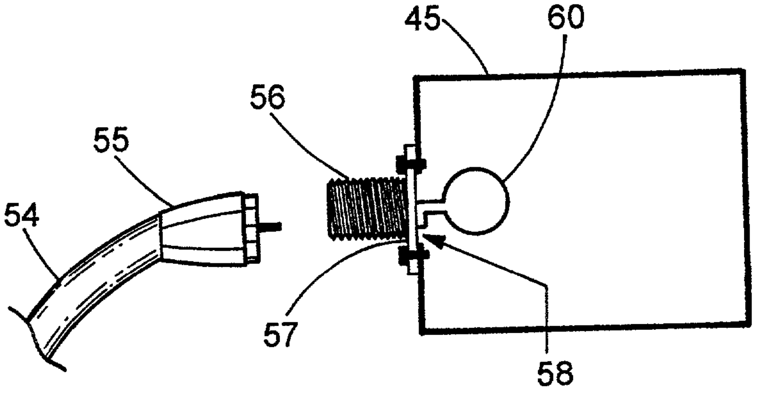
FIG. 6 shows a cabled antenna connection to the transmission guide in greater detail.

FIG. 6 shows a cable connection in greater detail. A threaded coaxial SMA-type connector includes a plug 55 mounted on the end of a cable 54 and a socket 56 having a flange 57 mounted to crossbeam 45 over an opening 58. An antenna element 60 extends from socket 56 and may have the shape of a loop, for example.

Figure 7:
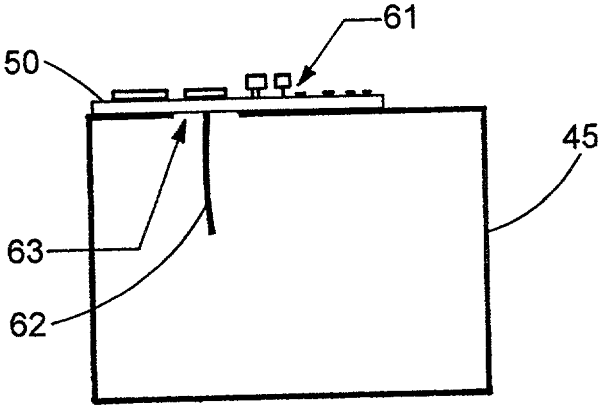
FIG. 7 shows an electronic module integrally mounted to the structural member with an antenna extending from the module into the transmission guide.

As shown in FIG. 7, circuit board 50 includes electronic devices 61 for providing an RF transceiver together with the other intended functions of the particular module (a module cover and other connections such as a power connection are not shown for clarity). Board 50 is mounted over an opening 63 and has an antenna 62 projecting through opening 63 into the transmission guide within crossbeam 45, thus avoiding the need for a cable feed.

Figure 8:
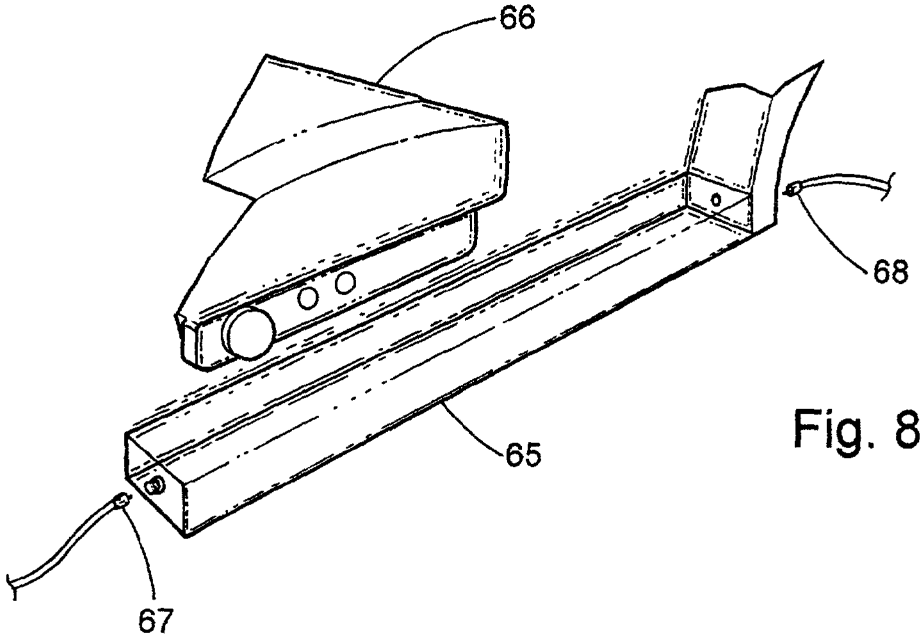
FIG. 8 is a perspective view of a body side rail or channel for providing a transmission guide.

FIG. 8 illustrates a structural member comprising a side rail 65 formed in a vehicle body along the vehicle floor near the edge of a seat 66. Rail 65 can be an integral part of a vehicle body stamping or can be added after stamping. Antenna connections 67 and 68 are made for respective electronic modules (not shown).

Figure 9:
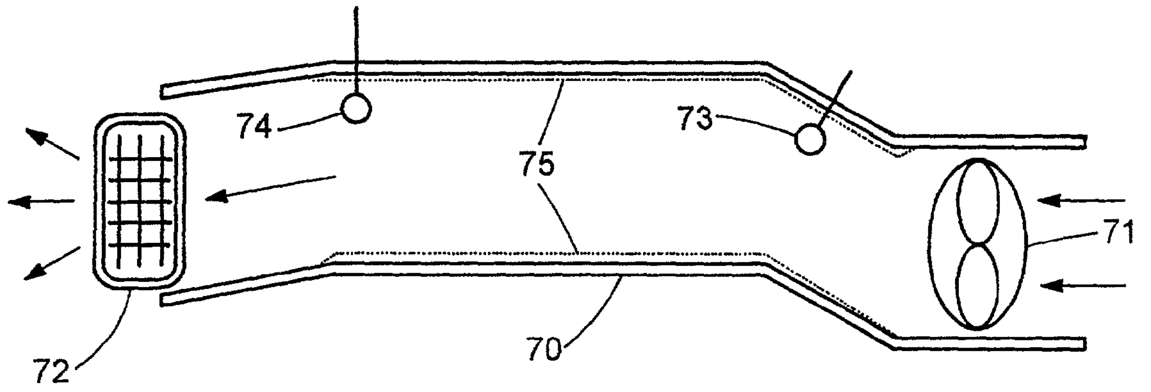
FIG. 9 is a side cross section of a vehicle air duct providing a transmission guide.

As shown in FIG. 9, an air duct 70 for carrying air from a blower fan 71 to a grille 72 can provide the structural member for creating a transmission guide between antennas 73 and 74. An automotive air duct is typically formed of molded plastic and is not electrically conductive. Therefore, a conductive coating 75 is added to duct 70, at least for the portion of duct 70 between antennas 73 and 74. The coating may be added using known techniques such as vapor deposition or spray forming of a layer or by affixing a conductive sheet using adhesive, for example.

The ends of air duct 70 must be open for free flow of air, such that confinement of the RF signal is reduced and some power is lost. Nevertheless, performance is still markedly improved over free air propagation, including reduced power requirements and reduced interference.

Figure 10:
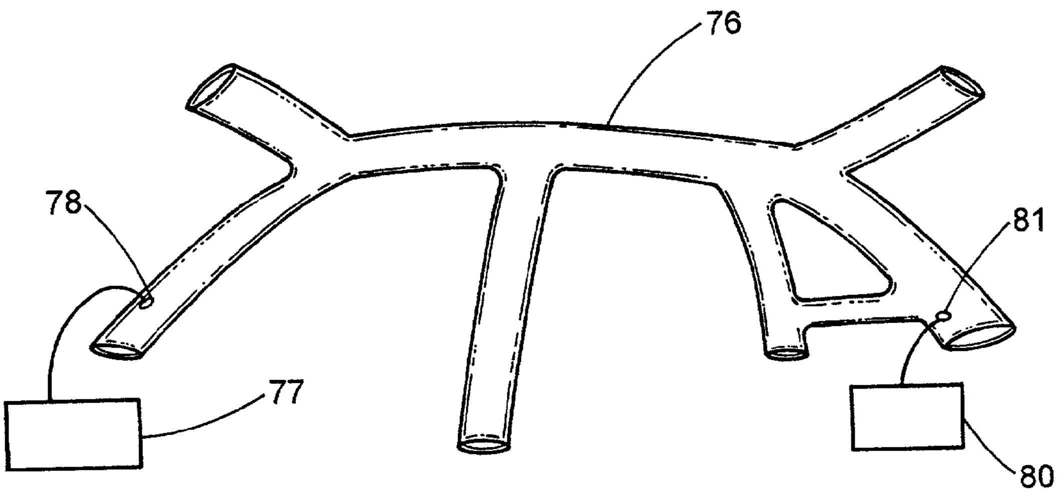
FIG. 10 is a side perspective view of a roof pillar structure for providing a transmission guide.

FIG. 10 shows a roof pillar structure 76 for providing a transmission guide between a first module 77 having an antenna placed in a first opening 78 and a second module 80 having an antenna placed in a second opening 81.

Various body panels, such as a door panel, are also suitable for providing transmission guides. For purposes of the present invention, the elongated space for providing a transmission guide need not be tubular but can have complex geometry with significant width or height in one or more directions perpendicular to the intended direction of propagation of RF signals between antennas (e.g., between points in a door panel).

Figure 11:
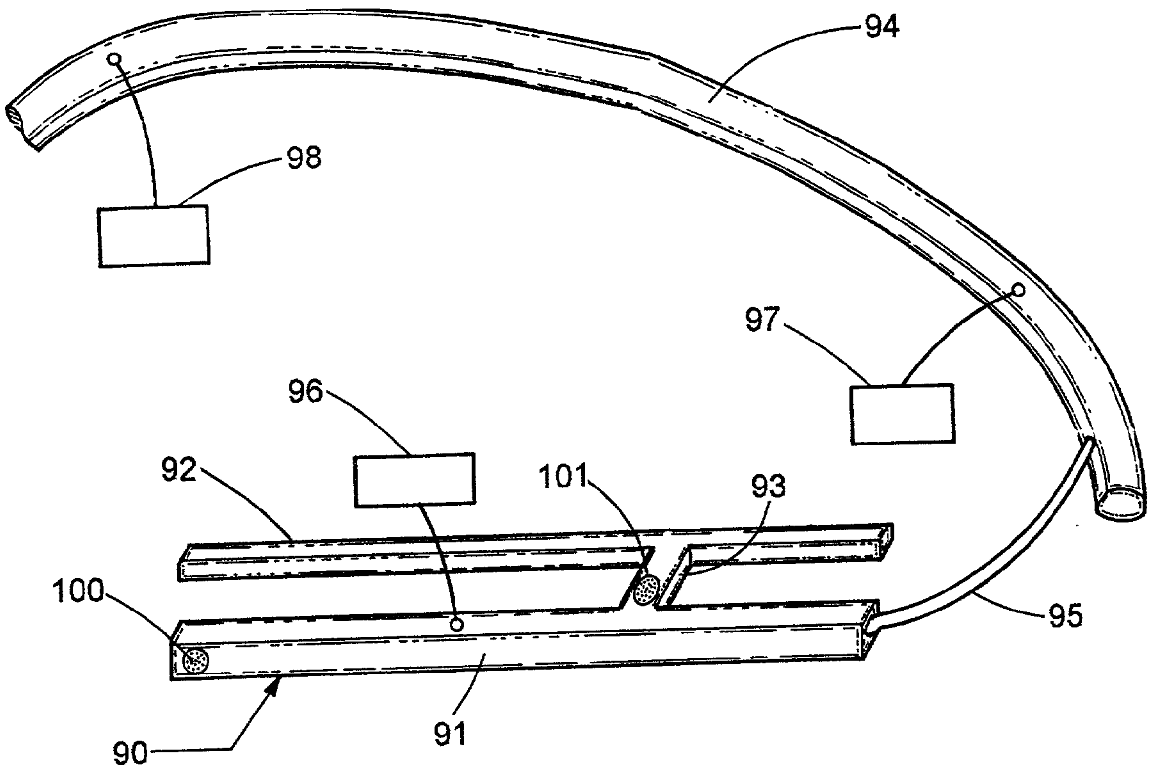
FIG. 11 is a perspective view showing composite structures including an auxiliary tube for providing a transmission guide.

FIG. 11 shows a composite structure where a plurality of structural members cooperate to form the transmission guide. A vehicle frame 90 is comprised of a hollow tubular steel structure including side rails 91 and 92 and a transverse beam 93 which provide support for a vehicle body. A roof pillar 94 is a steel tubular member extending along the top of the vehicle for supporting a roof. An open-ended auxiliary tube 95 comprised of conductive material is connected between respective openings in rail 91 and pillar 94 to create a continuous, elongated space for acting as a transmission guide. Several electronic modules have respective RF antennas mounted within the transmission guide, thereby forming a wireless network within the vehicle. RF absorbing material 100 and 101 is mounted within predetermined positions in frame 90 to reduce undesired reflections.

The invention described herein exploits waveguide-like properties of an enclosed RF cavity to transport RF signals from point to point within a vehicle or other structure. Since very low RF energy loss is achieved, very low-power RF driver circuits can be used. By confining the RF communication channel within a shielded cavity, the RF link is protected from jamming by other sources and the creation of interference for other systems is also reduced. Almost any structural member forming an enclosed space within a surface of electrically conducting material can be used as a transmission guide. Many already existing vehicle members, such as cross-car beams, already satisfy the necessary characteristics for a transmission guide. For example, existing cross-car beams have been found to carry RF signals having frequencies greater than about 4 GHz without any modifications.

What is claimed is:

1. A method of distributing information from a first electronic module to a second electronic module, said first and second electronic modules being in physically separated locations within a transportation vehicle, said method comprising the steps of:

selecting a structural member forming a portion of said transportation vehicle for use as a transmission guide having an enclosed, elongated space with first and second openings substantially proximate to said first and second electronic modules, respectively;

encoding said information in said first electronic module into a radio-frequency signal;

coupling said radio-frequency signal from said first electronic module into said transmission guide at said first opening;

coupling said radio-frequency signal from said transmission guide at said second opening to said second electronic module; and decoding said radio-frequency signal in said second electronic module to recover said information.

2. The method of claim 1 wherein said structural member is comprised of an electrically conductive metal.

3. The method of claim 1 wherein said structural member is comprised of a nonconductive material having a coating of electrically conductive material.

4. The method of claim 1 further comprising the step of:

providing RF absorptive material on selected surfaces of said structural member to reduce non-useful reflections of said radio-frequency signal.

5. The method of claim 1 further comprising the step of:

mounting at least one of said first and second electronic modules substantially directly to said structural member at said corresponding opening, said at least one electronic module having a fixed antenna extending from said electronic module into said corresponding opening.

6. The method of claim 1 further comprising the steps of:

mounting a radio-frequency antenna element in association with one of said openings; and coupling said antenna element with a corresponding one of said electronic modules by a wire cable.

7. The method of claim 1 wherein said structure is comprised of a motor vehicle.

8. A wireless communication system for communicating within a transportation vehicle, comprising:

a first electronic module being a source of information to be communicated, said first electronic module encoding said information into a radio-frequency signal;

a second electronic module being a recipient of said information, said first and second electronic modules being in physically separated locations within said transportation vehicle, said second electronic module decoding said radio-frequency signal to recover said information;

a structural member forming a transmission guide having an enclosed, elongated space with first and second openings substantially proximate to said first and second electronic modules, respectively, wherein said structural member is selected from the group comprising a portion of a body of said transportation vehicle and a portion of a frame of said transportation vehicle;

a first coupler for coupling said radio-frequency signal from said first electronic module into said transmission guide at said first opening; and a second coupler for coupling said radio-frequency signal from said transmission guide at said second opening to said second electronic module.

9. The system of claim 8 wherein said structural member is comprised of an electrically conductive metal.

10. The system of claim 8 wherein said structural member is comprised of a nonconductive material having a coating of electrically conductive material.

11. The system of claim 8 further comprising RF absorptive material on selected inside surfaces of said transmission guide to reduce non-useful reflections of said radio-frequency signal.

12. The system of claim 8 wherein said structural member comprises a cross-car beam.

13. The system of claim 8 wherein said structural member comprises a rail.

14. The system of claim 8 wherein said structural member comprises a body panel.

15. The system of claim 8 wherein said structural member comprises a rocker panel.

16. The system of claim 8 wherein said structural member comprises a roof pillar.

17. The system of claim 8 wherein said structural member comprises an air duct.

18. The system of claim 8 wherein said structural member comprises an auxiliary tube mounted to said structure.

19. The system of claim 8 wherein said transmission guide comprises a combination of sub-members joined so that said elongated space is uninterrupted.

20. The system of claim 8 wherein said elongated space is substantially sealed.

21. The system of claim 8 wherein said first and second couplers are comprised of respective antenna wires suspended within said transmission guide.

22. The system of claim 21 wherein at least one of said antenna wires is comprised of a loop.

23. The system of claim 21 wherein at least one of said antenna wires is comprised of a straight probe.

24. The system of claim 21 further comprising at least one coaxial cable coupling one of said antenna wires to a respective electronic module.

25. The system of claim 21 wherein one of said electronic modules is mounted substantially directly upon said structural member and wherein said antenna wire projects from said electronic module into said respective opening.

26. The system of claim 8 further comprising at least a third electronic module for communicating said information and a third coupler for coupling said radio-frequency signal from said transmission guide at a third opening.

27. The system of claim 26 wherein said first, second, and third electronic modules each provides two-way communication via said transmission guide.

* * * * *